US011283720B1

(12) United States Patent
Long et al.

(10) Patent No.: US 11,283,720 B1
(45) Date of Patent: Mar. 22, 2022

(54) METHODS AND SYSTEMS FOR ACCELERATED HEALTH MONITORING FOR LOAD BALANCERS

(71) Applicant: Pensando Systems Inc., Milpitas, CA (US)

(72) Inventors: William R. Long, Morrisville, NC (US); Vipin Jain, San Jose, CA (US)

(73) Assignee: Pensando Systems, Inc., Milpitas, CA (US)

( * ) Notice: Subject to any disclaimer, the term of this patent is extended or adjusted under 35 U.S.C. 154(b) by 0 days.

(21) Appl. No.: 17/138,616

(22) Filed: Dec. 30, 2020

(51) Int. Cl.
| | | |
|---|---|---|
| H04L 12/803 | (2013.01) |
| H04L 12/863 | (2013.01) |
| H04L 29/06 | (2006.01) |
| H04L 29/08 | (2006.01) |
| H04L 12/801 | (2013.01) |
| H04L 47/125 | (2022.01) |
| H04L 47/62 | (2022.01) |
| H04L 69/22 | (2022.01) |
| H04L 67/02 | (2022.01) |
| H04L 47/19 | (2022.01) |

(52) U.S. Cl.
CPC .......... *H04L 47/125* (2013.01); *H04L 47/19* (2013.01); *H04L 47/62* (2013.01); *H04L 67/02* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 7,373,500 B2 * | 5/2008 | Ramelson | ........... | H04L 63/0428 713/150 |
| 9,390,055 B2 * | 7/2016 | Warfield | ............. | H04L 61/2007 |
| 10,979,383 B1 * | 4/2021 | Warfield | ............... | G06F 16/134 |
| 2011/0154461 A1 * | 6/2011 | Anderson | ........... | H04L 63/0227 726/7 |
| 2014/0304294 A1 * | 10/2014 | Sharma | ............. | G06F 16/24539 707/769 |

OTHER PUBLICATIONS

Bishop, M. Ed., "Hypertext Transfer Protocol Version 3 (HTTP/3)", Jun. 9, 2020, 72 pgs.
Fielding, R. Ed. et al. "Hypertext Transfer Protocol (HTTP/1.1): Semantics and Content", Jun. 2014, 101 pgs.
Belshe, M. et al. "Hypertext Transfer Protocol Version 2 (HTTP/2)", May 2015, 96 pgs.

* cited by examiner

*Primary Examiner* — Davoud A Zand
(74) *Attorney, Agent, or Firm* — Loza & Loza LLP

(57) ABSTRACT

A network appliance can maintain an active set indicating active backends for a load balanced network service. To monitor the health of the backends, the network appliance can transmit a network packet to a backend that is one of the active backends in the active set and can receive a response packet responsive to the network packet. An invariant hash can be calculated from the response packet using fields that are the same when the response is a normal response (e.g. not an error response) from a healthy backend. If the packet indicates an error or is otherwise indicative of a problem, the network appliance can determine, using the invariant hash, that the response packet does not match an expected result associated with the backend. Based on the error, the number of network packets resulting in errors, etc., the backend can be removed from the active set.

20 Claims, 15 Drawing Sheets

**Please Select The Invariant Fields For
The Backend Servers Of Your Service
(page 1 of 2)**

| Layer 2 Header Fields | | |
|---|---|---|
| Field Name | Example | Invariant? |
| Source MAC address | 00:0a:95:9d:68:16 | yes |
| Destination MAC address | 00:1a:95:9d:68:16 | no |
| Ethertype | 0x0800 | yes |

| Layer 3 Header Fields | | |
|---|---|---|
| Field Name | Example | Invariant? |
| Version | 4 | yes |
| Header Length | 5 | yes |
| Differentiated Services Code Point | 1 | yes |
| Total Length | 4000 | no |
| Identification | 505 | no |
| L4 Protocol | 6 | yes |
| Source IP address | 192.168.0.1 | yes |
| Destination IP address | 8.8.8.8 | no |

| Layer 4 Header Fields | | |
|---|---|---|
| Field Name | Example | Invariant? |
| Source Port | 8080 | yes |
| Destination Port | 25577 | no |
| Sequence Number | 976 | no |
| Acknowledgment Number | 5894 | no |
| ACK Flag | 0 | no |
| PSH Flag | 0 | no |
| RST Flag | 0 | no |
| Checksum | 408 | no |

( Go To Page 2 )   ( Done )

FIG. 13

**Please Select The Invariant Fields For
The Backend Servers Of Your Service
(page 2 of 2)**

Layer 7 Header Fields (e.g. HTTP Fields)

| Field Name | Example | Invariant? |
|---|---|---|
| L7 Protocol | "HTTP/1.1" | yes |
| Response Code | 200 | yes |
| Date | Sun, 18 Oct 2012 10:36:20 | no |
| Server | Apache/2.2.14 (Win32) | yes |
| Last Modified Time | Fri, 16 Oct 2012 10:36:20 | no |
| Content Length | 230 | no |
| Content Type | text/html | yes |
| charset | iso-8859-1 | yes |
| Connection Status | closed | yes |

Layer 7 Payload Fields (e.g. HTML Fields)

| Field Name | Example | Invariant? |
|---|---|---|
| DOCTYPE | html | yes |
| Language | en-US | yes |
| HTML Version | 5.1 | yes |
| Character Set | utf-8 | yes |
| Description | Hello World Page | no |
| Keywords | Patent, Hash, Balance | no |
| Viewport | initial-scale=1.0 | yes |
| Title | Hello World | no |
| Stylesheet | /themes/css/style-min-v1.css | yes |

( Go To Page 1 )   ( Done )

FIG. 14

METHODS AND SYSTEMS FOR ACCELERATED HEALTH MONITORING FOR LOAD BALANCERS

TECHNICAL FIELD

The embodiments relate to computer networks, storage area networks, ethernet, InfiniBand (IB), channel adapters, network interface cards, network appliances, routers, switches, load balancers, packet processing pipelines, P4 packet processing pipelines, programmable packet processing pipelines implemented using special purpose circuitry, and HPC (high performance computing).

BACKGROUND

High traffic cloud services are often implemented as load balanced network services having numerous backend servers simultaneously serving client requests. The front facing interface of a load balanced network service can be a load balancer that is responsible for receiving client requests and selecting a backend to service the client. Load balancers therefore have an active set that indicates healthy backends that can service clients. Maintaining the active set is burdensome as the high traffic network service attempts to track which of the backends are performing normally and which are not.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method implemented by a network appliance. The method can include maintaining an active set indicating active backends for a load balanced network service, transmitting a network packet to a backend that is one of the active backends in the active set, receiving a response packet responsive to the network packet, and calculating an invariant hash from the response packet. The method can also include determining, using the invariant hash, that the response packet does not match an expected result associated with the backend, and removing the backend from the active set.

Another aspect of the subject matter described in this disclosure can be implemented by a network appliance comprising a memory configured to store an active set indicating active backends for a load balanced network service. The network appliance can also include a packet processing pipeline configured to transmit a network packet to a backend that is one of the active backends in the active set, receive a response packet responsive to the network packet, and determine, using an invariant hash calculated from the response packet, that the response packet does not match an expected result associated with the backend.

Yet another aspect of the subject matter described in this disclosure can be implemented by a system comprising a means for maintaining an active set indicating active backends for a load balanced network service, a means for calculating an invariant hash from a response packet responsive to a network packet forwarded to a backend that is one of the active backends in the active set, and a means for using the invariant hash to determine that the response packet does not match an expected result associated with the backend.

In some implementations of the methods and devices, a packet processing pipeline in a data plane of the network appliance is configured to calculate the invariant hash, and determine that the invariant hash does not match an expected invariant hash associated with the backend. In some implementations of the methods and devices, the network packet includes an HTTP packet. In some implementations of the methods and devices, the method includes receiving the network packet from a client, wherein the network packet is sent by the client to the load balanced network service. In some implementations of the methods and devices, the method includes generating the network packet, wherein the network packet is a synthetic check request packet. In some implementations of the methods and devices, the invariant hash is calculated using at least one of a layer 3 header field, a layer 4 header field, a layer 5 header field, or a layer 7 field.

In some implementations of the methods and devices, the method includes forwarding at least part of the response packet from a data plane of the network appliance to a control plane of the network appliance, and determining, by the control plane, an error type indicated by the response packet, wherein the error type is a layer 4 error, a layer 5 error, a layer 6 error, or a layer 7 error. In some implementations of the methods and devices, the expected result includes a plurality of expected hashes. In some implementations of the methods and devices, the method includes producing a field set from an expected response packet received from the backend, and producing an expected hash based on an invariant field set selected by a user from the field set, wherein the expected result is or includes the expected hash.

In some implementations of the methods and devices, the method includes forwarding a plurality of network packets to the backend, receiving a plurality of response packets responsive to the plurality of network packets, producing a proposed invariant field set based on the plurality of response packets, and producing an expected hash based on an invariant field set selected by a user based on the proposed invariant field set, wherein the expected result is or includes the expected hash. In some implementations of the methods and devices, the network appliance is configured to remove the backend from the active set based at least in part on determining that the response packet does not match the expected result associated with the backend. In some implementations of the methods and devices, the network appliance includes a data plane that includes the packet processing pipeline, the packet processing pipeline configured to calculate the invariant hash. The network appliance can also include a control plane, configured to receive at least part of the response packet from the data plane, and determine an error type indicated by the response packet.

In some implementations of the methods and devices, the network appliance is configured to produce a field set from an expected response packet received from the backend and produce an expected hash based on an invariant field set selected by a user from the field set, wherein the expected result is or includes the expected hash. In some implementations of the methods and devices, the network appliance is configured to forward a plurality of network packets to the backend, receive a plurality of response packets responsive to the plurality of network packets, generate a proposed invariant field set based on the plurality of response packets, and generate an expected hash based on an invariant field set selected by a user based on the proposed invariant field set, wherein the expected result is or includes the expected hash. In some implementations of the methods and devices, the network packet is an HTTP packet, and the invariant hash is calculated using a layer 7 field.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 13 illustrates a first portion of an example of a graphical user interface (GUI) that can be used for selecting an invariant field set according to some aspects.

FIG. 14 illustrates a second portion of the example of a GUI that can be used for selecting an invariant field set according to some aspects.

Throughout the description, similar reference numbers may be used to identify similar elements.

DETAILED DESCRIPTION

Figure 1:
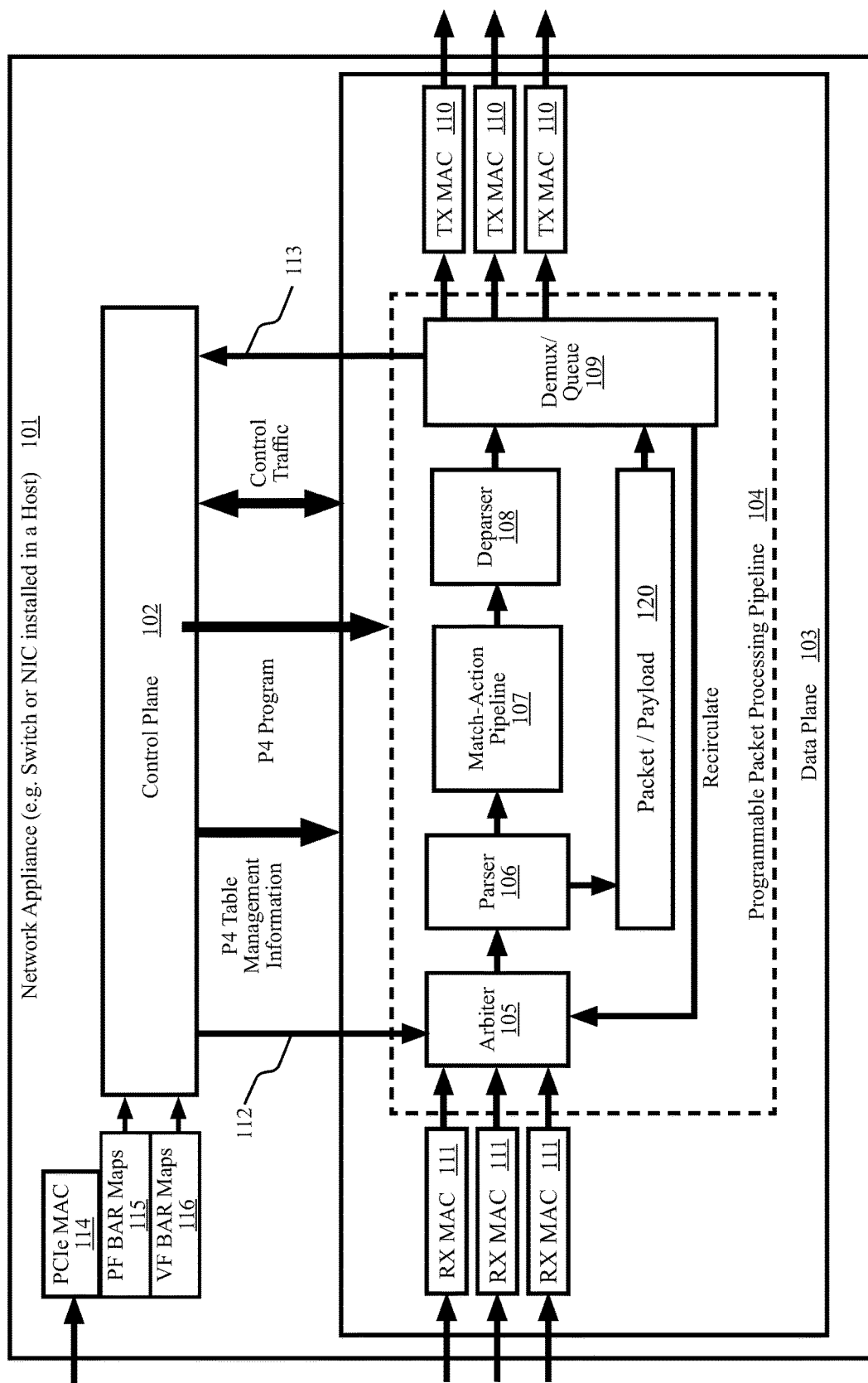
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Applications are often implemented as load balanced network services having load balancers that distribute client requests to backends. The backends can be web servers, database servers, or other servers that service client requests. An aspect of maintaining a load balanced network service is maintaining an adequate number of responsive backends. Typically, a proxy regularly sends synthesized requests to the backends, determines if the backend is responsive, and determines if its responses are responsive to the request or if the responses indicate errors. The synthetic requests are often application specific and the proxies often expect exact-match responses from the backends. The current solutions have a number of problems. One problem is frequency tuning such that synthetic requests are sent often enough that backend issues are discovered rapidly but not often enough to seriously burden the network service. Another problem is that the actual error can be difficult to diagnose because it may occur at layer 2, layer 7, or any layer in between. Software based diagnosis can include custom scripting or coding. In addition, encrypted payloads may require decryption before diagnosis.

A solution that scales to high volume data centers is to implement aspects of health monitoring in the data plane of a network appliance and may implement further aspects within the control plane. The data plane of the network appliance may process every request to a backend and every response from a backend. The data plane can therefore constantly monitor the backend. A healthy backend returns responses wherein certain header fields and payload data fields in the network packet are always the same. These invariant fields can be identified and used to produce an expected result, in particular an expected hash value. The data plane of the network appliance can calculate an invariant hash for every response returned by a backend and compare it to the expected result. As such, erroneous responses can be noticed immediately. In many cases, an unhealthy backend can be quickly and automatically removed from the load balancer's active set (which can be maintained in the data plane for load balancing the client requests) without requiring carefully crafted synthetic packets, custom diagnosis software, or human analysis and intervention.

There are many advantages to using the data plane of a network appliance for monitoring the health of the backends. One advantage is that the monitoring can be continuous and at a very high scale, checking every response regardless of whether the response is responsive to a user's request or to a synthetic request. Another advantage is that, using invariant hashes, a well-designed data plane, such as those using programmable Pensando ASICs, can perform the monitoring at line speed as a normal aspect of processing network traffic flows. Yet another advantage is that the faster detection of an inactive backend can result in a high availability of a service to the client. Furthermore, the data plane can alert the control plane when a response doesn't match an expected response. The control plane can diagnose the error based, for example, on the expected fields at different network layers. The control plane can also move backends in to and out of the active set based on preconfigured rules. As such, the active set can be automatically and rapidly adjusted to exclude unhealthy backends.

In the field of data networking, the functionality of network appliances such as switches, routers, and network interface cards (NICs) are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows, which include I/O and InfiniBand traffic flows, extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

FIG. 1 is a functional block diagram of a network appliance having a control plane and a data plane and in which aspects may be implemented. A network appliance 101 can be a switch, router, network interface card (NIC) installed in a host computer, etc. The network appliance can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "$P4_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and Internet Protocol (IP) headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A NIC 101 can have a peripheral component interconnect extended (PCIe) interface such as PCIe media access control (MAC) 114. A PCIe MAC can have a base address register (BAR) at a base address in a host system's memory space. Processes, typically device drivers within the host system's operating system, can communicate with the NIC via a set of registers beginning with the BAR. Some PCIe devices are single root input output virtualization (SR-IOV) capable. Such PCIe devices can have a physical function (PF) and multiple virtual functions (VFs). A PF BAR map 115 can be used by the host machine to communicate with the PCIe card. A VF BAR map 116 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as RDMA transfers to other VMs running on the same or other host computers. Similarly, the NIC can provide NVMe and SCSI PFs and VFs to VMs running on the host.

Figure 2:
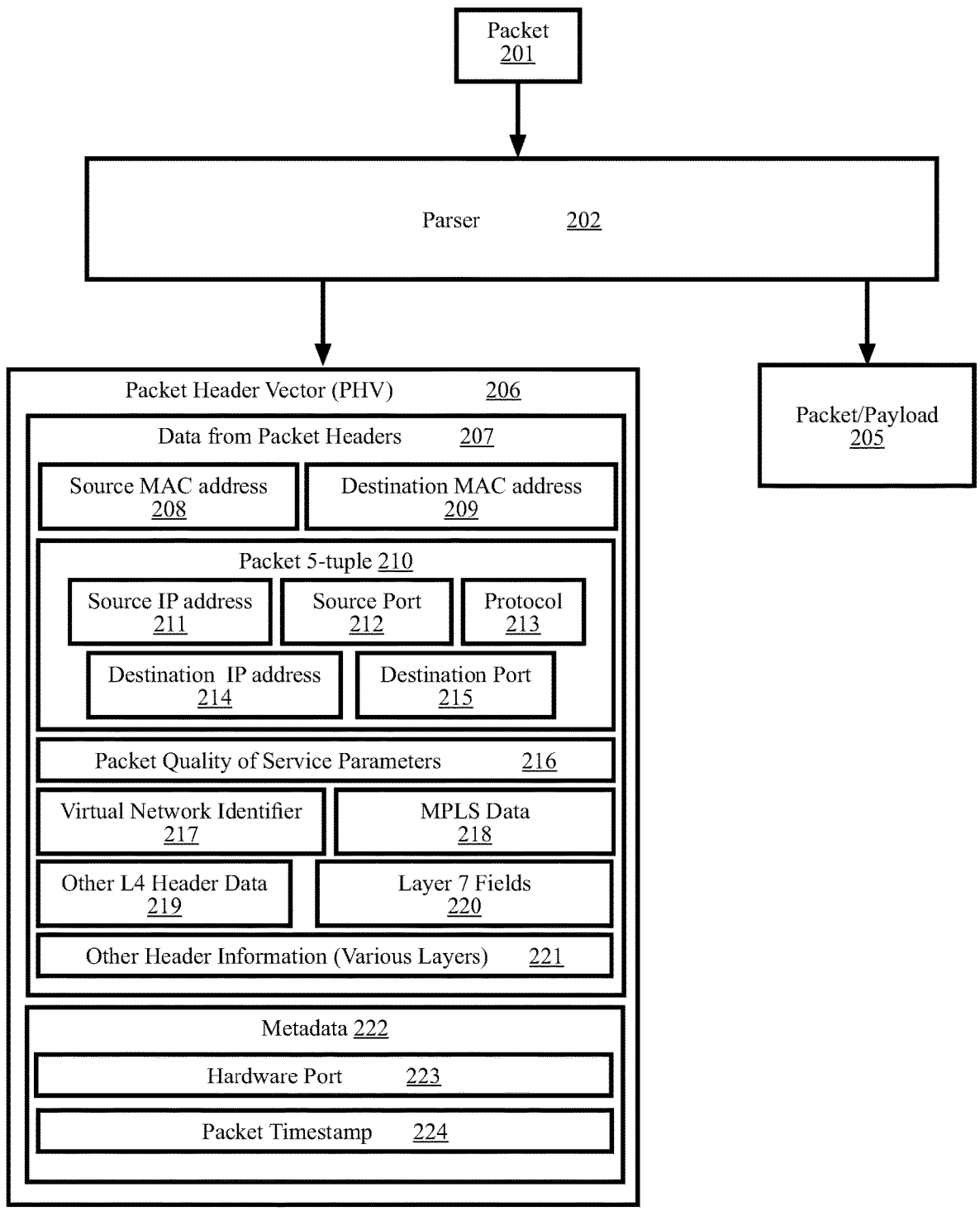
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The layer 7 fields 220 can be obtained from a layer 7 packet contained in, for example, a layer 4 payload. Some of the layer 7 fields can be layer 7 header fields from the header of a layer 7 packet. Some of the layer 7 fields can be layer 7 data fields from the payload of a layer 7 packet. The other header information 221 is the other information contained in, for example, the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Those practiced in protocols such as NVMe/TCP realize that NVMe data packets also have well defined and standardized formats. As such, NVMe/TCP packets, PDUs, and packet headers can be easily created and processed by a programmable data plane such as the data plane of a P4 programmable NIC. Specifically, the parser can parse NVMe packets and PDUs, the match-action pipeline can process NVMe packets and PDUs, the deparser can assemble NVMe packets and PDUs, the demux/queue can assemble NVMe packets and PDUs, and the network appliance or NIC can send and receive NVMe packets and PDUs.

Figure 3:
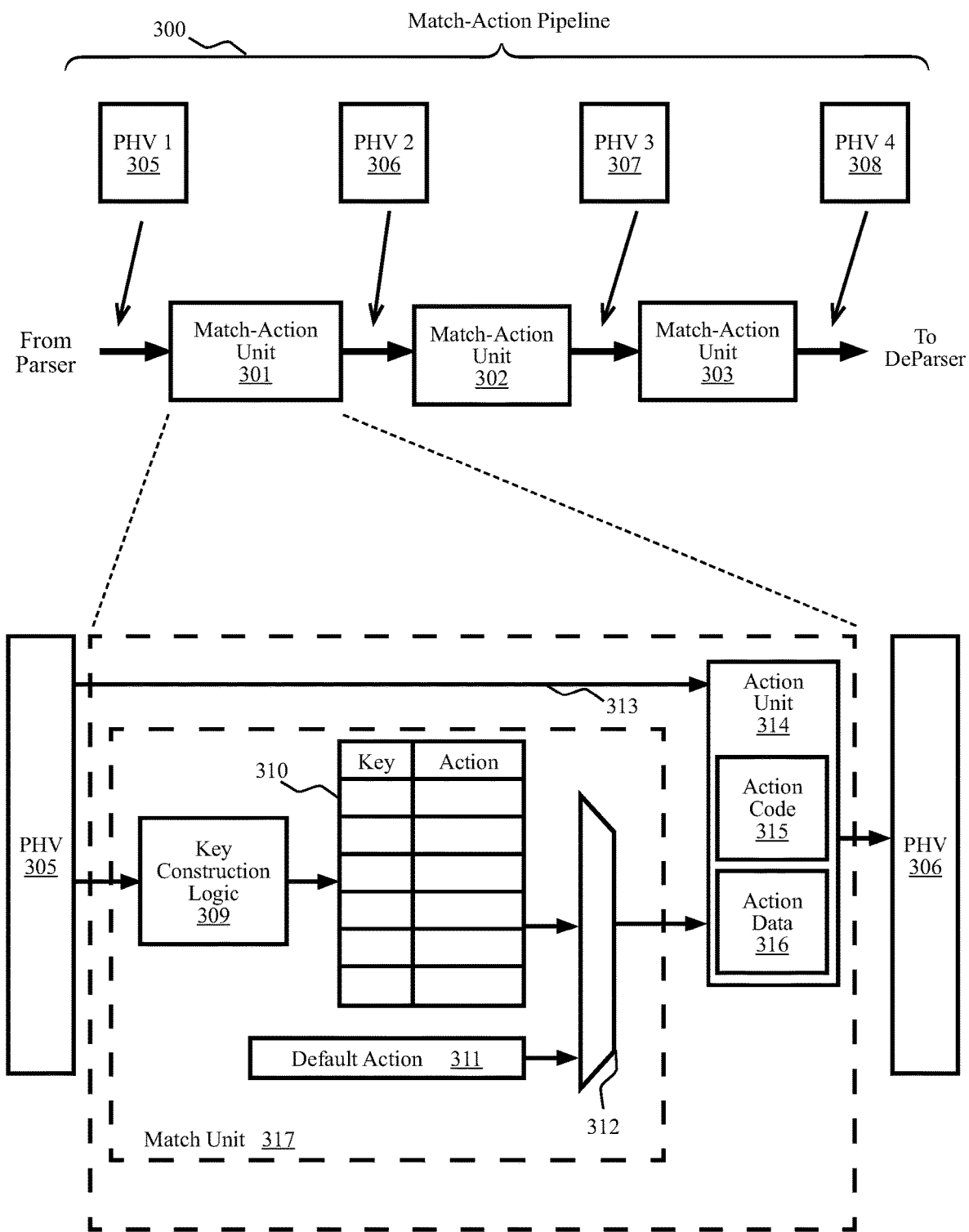
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g. 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table are managed by the control plane.

Figure 4:
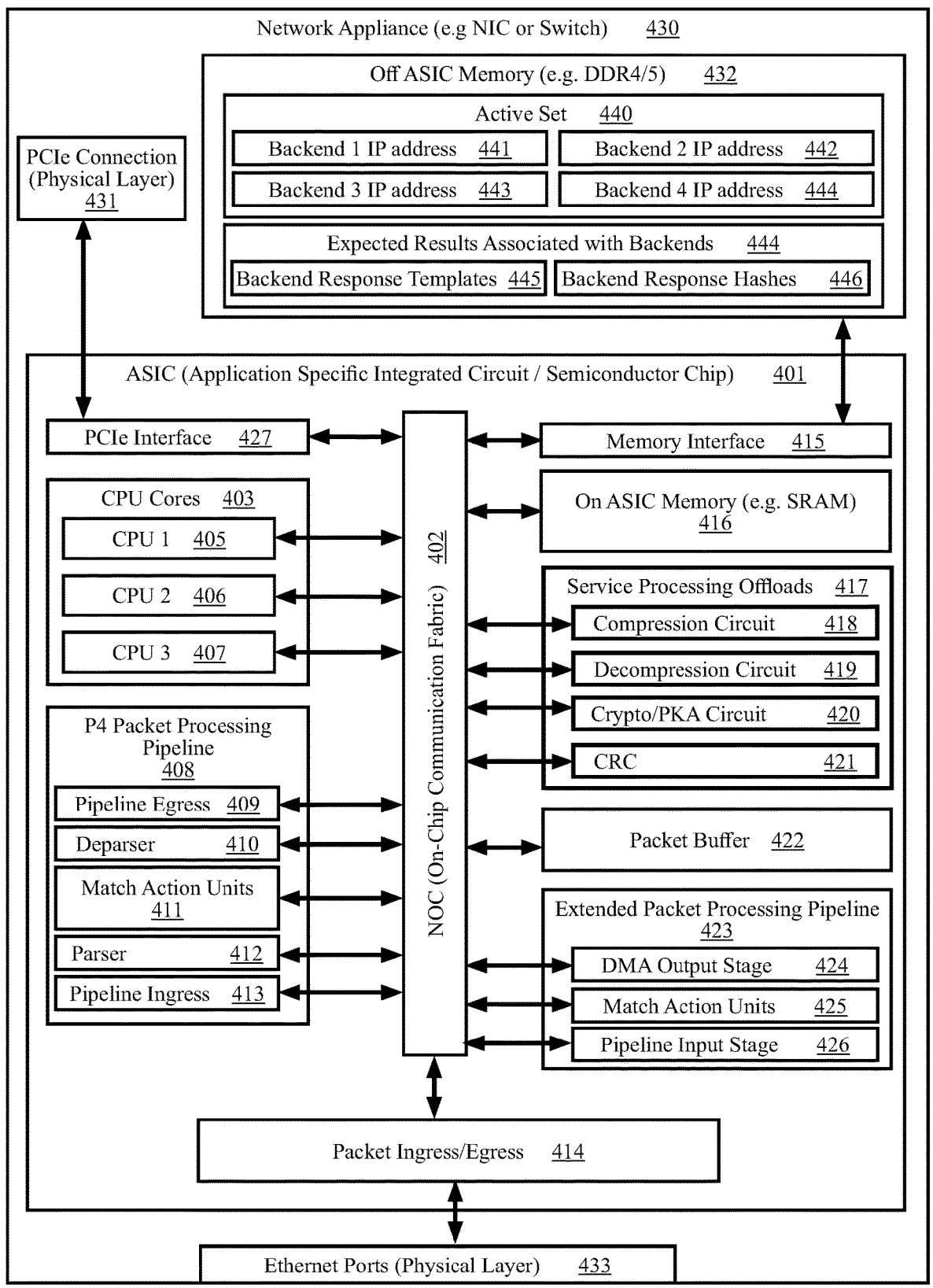
FIG. 4 is a functional block diagram of a network appliance such as a network interface card (NIC) or a network switch having an application specific integrated circuit (ASIC), according to some aspects.

FIG. 4 is a functional block diagram of a network appliance 430 such as a network interface card (NIC) or a network switch having an application specific integrated circuit (ASIC) 401, according to some aspects. The NIC can be installed in a host computer and can act as a network appliance for the host computer. The NIC 430 includes a PCIe connection 431, off ASIC memory 432, and ethernet ports 433. The PCIe connection provides for installing the NIC in a host computer having a PCIe bus. The off ASIC memory 432 can be one of the widely available memory modules or chips such as double data rate 4 (DDR4) synchronous dynamic random-access memory (SDRAM) such that the ASIC has access to many gigabytes of memory on the NIC 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g. SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an Infini-Band channel adapter, of an NVMe card, and of a network appliance that processes network traffic flows carried by IP (internet protocol) packets.

The P4 packet processing pipeline 408 is a specialized set of elements for processing network packets such as IP (internet protocol) packets and InfiniBand PDUs (protocol data units). The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The NIC 430 can include a memory 432 for running Linux or some other operating system, for storing indicators of the active set of backends, and for expected results associated with the backends. The indicators for the active set 440 can be a list including the IP addresses of backends in the active set. The active set 440 is shown including the IP address for backend 1 441, the IP address for backend 2 442, the IP address for backend 3 443, and the IP address for backend 4 444. The active set may also store other data related to the backends in association with the indicators, such as statistics for the numbers of correct response packets and erroneous response packets, that can be used to determine that a backend is unhealthy. For example, a certain number of layer 2 errors within a timespan can indicate the backend is down. Similarly, a certain number of layer 7 errors within a timespan may indicate a backend is suffering a configuration or data access problem.

The expected results associated with the backends 444 can include backend response templates 445 and backend response hashes 446. The response templates can indicate the data fields that are expected within a response from a backend and the contents of those data fields. For example, the source IP address in a packet from backend 1 should contain the backend 1 IP address. The backend response hashes can be the expected hashes that are hash values expected to be calculated using the invariant fields in the responses from the backends. For example, if the only invariant field is the source IP address, then the expected hash for backend 1 is a hash of the IP address of backend 1.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

The ASIC 401 is illustrated with a P4 packet processing pipeline 408 and an extended packet processing pipeline 423. The extended packet processing pipeline is a packet processing pipeline that has a direct memory access (DMA) output stage 424. The extended packet processing pipeline has match-action units 425 that can be arranged as a match-action pipeline such as match-action pipeline 300. The extended packet processing pipeline has a pipeline input stage 426 that can receive PHVs or directives to perform operations. For example, data in the PHV can indicate that the PHV is a directive for implementing an RDMA operation. The key construction logic 309 of the MPUs can use the data to form a key that indexes into a lookup table 310 to locate an action. The MPUs can thereby execute actions such that the DMA output stage 424 writes InfiniBand PDU payload data into the off ASIC memory 432 or into the host memory.

All memory transactions in the NIC 430, including host memory transactions, on board memory transactions, and registers reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
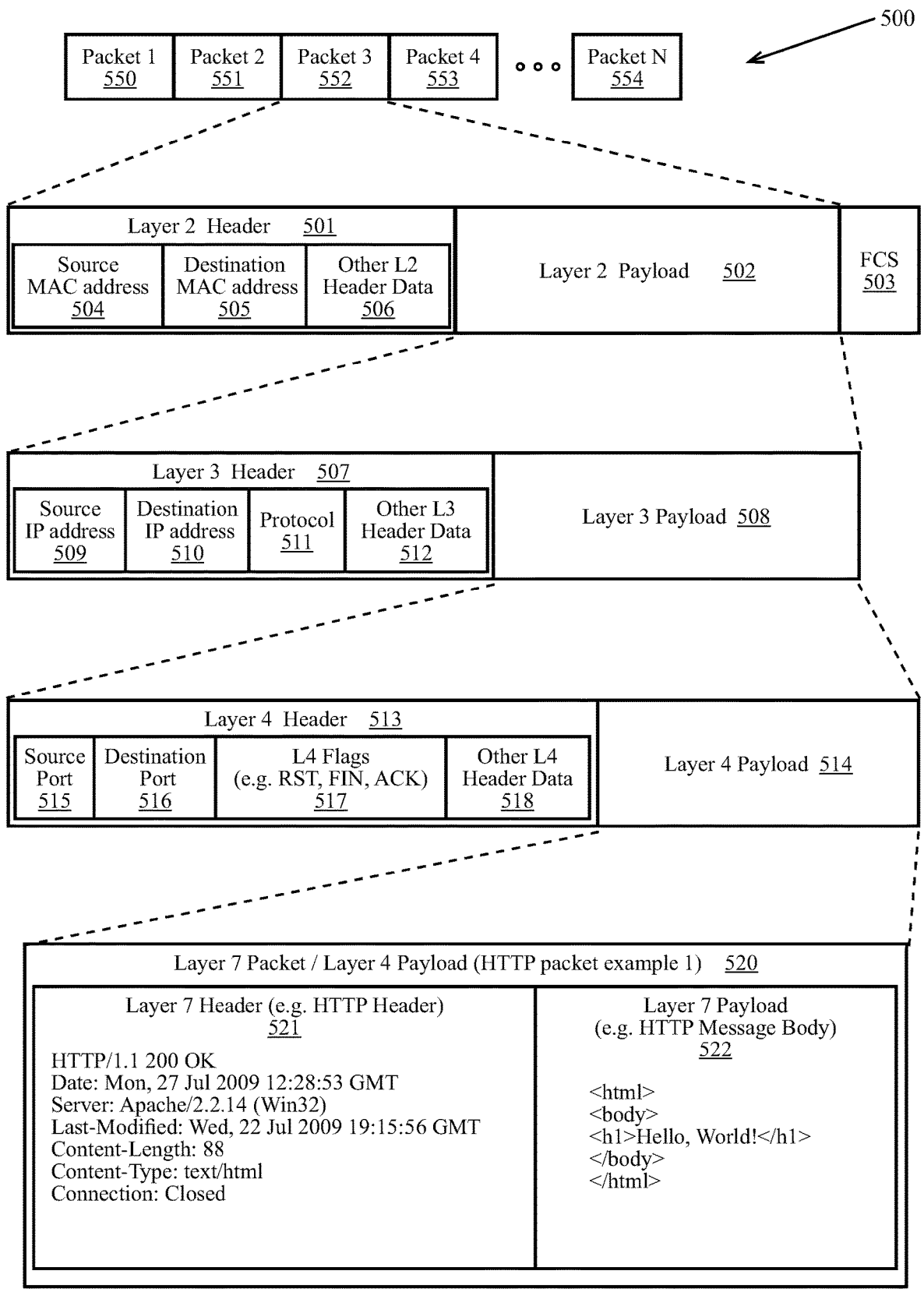
FIG. 5 illustrates packet headers and payloads of packets for network traffic flows according to some aspects.

FIG. 5 illustrates packet headers and payloads of packets for network traffic flows 500 including HTTP traffic and InfiniBand PDUs according to some aspects. A network traffic flow 500 can have numerous packets such as a first packet 550, a second packet 551, a third packet 552, a fourth packet 553, and a final packet 554 with many more packets between the fourth packet 553 and the final packet 554. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS) 503. The layer 2 header can contain a source MAC address 504, a destination MAC address 505, and other layer 2 header data 506. The input ports 111 and output ports 110 of a network appliance 101 can have MAC addresses. A network appliance 101 can have a MAC address that is applied to all or some of the ports. Alternatively, a network appliance may have one or more ports that each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3 is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 507 and a layer 3 payload 508. The layer 3 header 507 can have a source IP address 509, a destination IP address 510, a protocol indicator 511, and other layer 3 header data 512. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 508 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 507 using protocol indicator 511. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 508 includes a TCP header and a TCP payload. UDP can provide for computer applications to send messages, in this case referred to as datagrams, to other hosts on an IP network using a connectionless model. When carrying UDP data, a layer 3 payload 508 includes a UDP header and a UDP payload. ICMP is used by network devices, including routers, to send error messages and operational information indicating success or failure when communicating with another IP address. ICMP uses a connectionless model.

A layer 4 packet can have a layer 4 header 513 and a layer 4 payload 514. The layer 4 header 513 can include a source port 515, destination port 516, layer 4 flags 517, and other layer 4 header data 518. The source port and the destination port can be integer values used by host computers to deliver packets to application programs configured to listen to and send on those ports. The layer 4 flags 517 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 514 can contain a layer 7 packet.

The application layer, often called layer 7, includes the protocols used by most applications for providing user services or exchanging application data over the network connections established by the lower level protocols. Examples of application layer protocols include RoCE v2 (RDMA over Converged Ethernet version 2), HTTP (Hypertext Transfer Protocol), FTP (File Transfer Protocol), SMTP (Simple Mail Transfer Protocol), and DHCP (Dynamic Host Configuration). Data coded according to application layer protocols can be encapsulated into transport layer protocol units (such as TCP or UDP messages), which in turn use lower layer protocols to effect actual data transfer.

A layer 4 payload 514 may include a layer 7 packet 520. A layer 7 packet can have a layer 7 header 521 and a layer 7 payload 522. The illustrated layer 7 packet is an HTTP packet. The layer 7 header 521 is an HTTP header, and the layer 7 payload 522 is an HTTP message body. The HTTP message body is illustrated as a hypertext markup language (HTML) document. HTTP are specified in requests for comment (RFCs) published by the Internet Engineering Task Force (IETF). IETF RFC 7231 specifies HTTP version 1.1. IETF RFC 7540 specifies HTTP version 2. HTTP version 3 is not yet standardized, but a draft standard has been published by the IETF as "draft-ietf-quic-http-29". HTML is a "living" standard that is currently maintained by Web Hypertext Application Technology Working Group (WHATWG). The HTTP header can be parsed by a P4 pipeline because it has a well-known format having well known header fields. Similarly, HTML documents can be parsed, at least in part, by a P4 pipeline to the extent that the HTML document has specific fields, particularly if those specific fields reliably occur at specific locations within the HTML document. Such is often the case when the backends consistently respond by providing HTML documents.

The first line of the HTTP header 521 includes the fields "HTTP/1.1" and "200 OK". The second line contains a timestamp. The third line indicates the server version. The fourth line is a timestamp indicating the last time that the HTML document in the payload changed. The fifth line indicates the length of the payload. The sixth line indicates the type of encoding used for the content. The seventh line indicates a connection status. The HTTP header contains invariant fields that should be expected when the backend responds without error. The invariant fields include "HTTP/1.1", "200 OK", "Server: Apache/2.2.14 (Win32)", and "Content-Type: text/html". The entirety of the HTML document, in this instance, is likely invariant. Note that the fields may change if the server changes or if the HTML content changes. It is likely that the HTTP server can return many different HTML documents in response to client requests. As such, a single expected hash may be used based on fields that are invariant for all of the documents. In such a case, the expected result is that single expected hash. Alternatively, multiple expected hashes may be used with each expected hash corresponding to one or more of the pages returned by the HTTP server when there has been no error. In such a case, the expected result includes numerous expected hashes. An invariant hash calculated from a response matches the expected result when it matches any of the expected hashes in the expected result. As discussed above, a P4 pipeline can parse the HTTP header and the HTML document in the HTTP payload. The parsing operation can identify the values, or text, held in each invariant field. The invariant fields can be used to calculate the invariant hash. Referring to the ASIC of FIG. 4, the CRC circuit 421 is a special purpose circuit in the data plane of the network appliance that can calculate the invariant hash.

Figure 6:
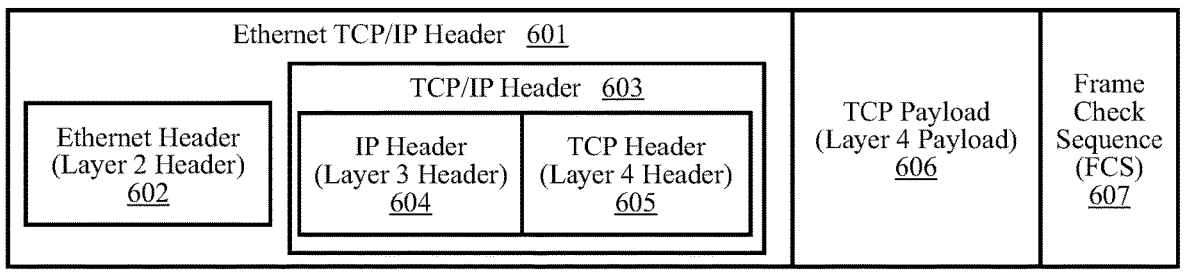
FIG. 6 illustrates an ethernet TCP/IP packet according to some aspects.

FIG. 6 illustrates an Ethernet TCP/IP packet according to some aspects. Ethernet packets, such as Ethernet TCP/IP packets, have an Ethernet header 602 and a frame check sequence (FCS) 607. As discussed above, Ethernet is a layer 2 protocol. An Ethernet TCP/IP header 601 has an Ethernet header 602 and a TCP/IP header 603. The TCP/IP header 603 has an IP header 604 and a TCP header 605. The Ethernet TCP/IP packet has a TCP payload 606 as the layer 4 payload.

Figure 7:
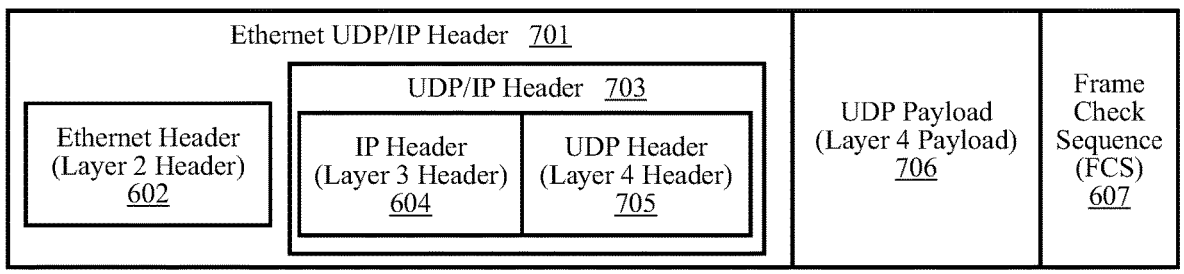
FIG. 7 illustrates an ethernet UDP/IP packet according to some aspects.

FIG. 7 illustrates an ethernet UDP/IP packet according to some aspects. An Ethernet UDP/IP packet differs from an Ethernet TCP/IP packet by having UDP as the layer 4 protocol. Ethernet UDP/IP packets, have an Ethernet header 602 and a frame check sequence (FCS) 607. An Ethernet UDP/IP header 701 has an Ethernet header 602 and a UDP/IP header 703. The UDP/IP header 703 has an IP header 604 and a UDP header 705. The Ethernet UDP/IP packet has a UDP payload 706 as the layer 4 payload.

Figure 8:
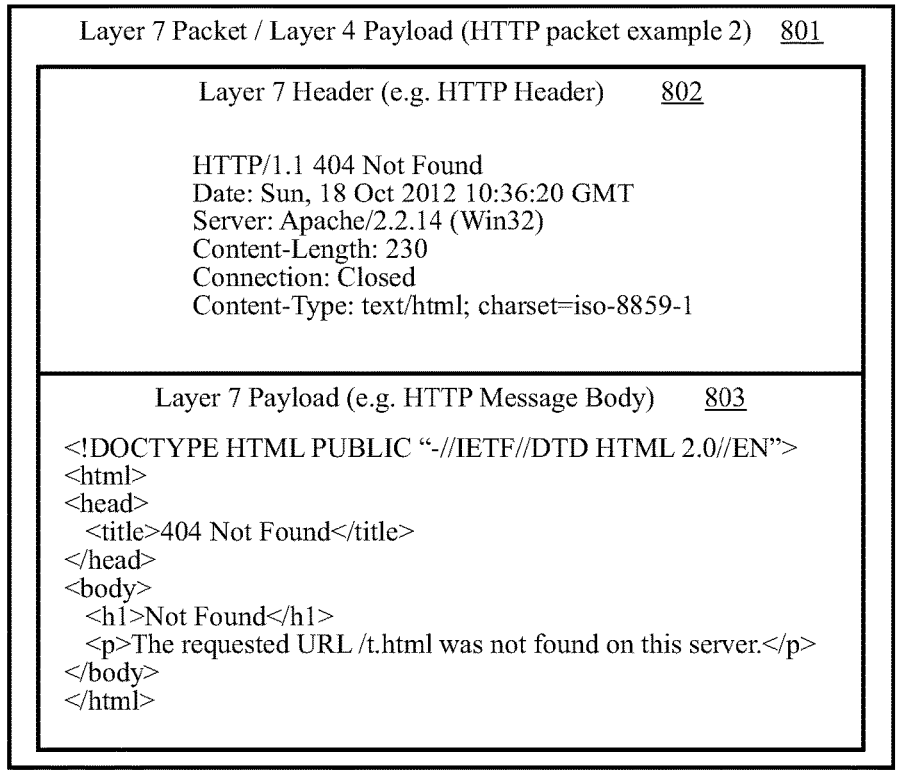
FIG. 8 illustrates a layer 7 packet indicating an error that is not an expected response according to some aspects.

FIG. 8 illustrates a layer 7 packet 801 indicating an error that is not an expected response according to some aspects. The first line of the HTTP header 802 includes the fields "HTTP/1.1" and "404 Not Found". The second line contains a timestamp. The third line indicates the server version. The fourth line indicates the payload length. The fifth line contains a connection status. The sixth line indicates the type of encoding used for the content. As seen in FIG. 5, the invariant field for a response that isn't an error contains "200 OK" instead of "400 Not Found". As such, an invariant hash calculated using HTTP header 802 would not match an expected result.

The layer 7 payload 803 also contains layer 7 fields that may differ from those that should be returned in a non-erroneous response packet. For example, the HTTP server may be configured to always return the same title field in all cases, to return a home page whenever an unknown page is requested, etc. As such, the title field could, in some cases, be an invariant field. In an alternative, a synthetic check generator may intentionally induce 404 responses to ensure that the backend is responding appropriately.

Figure 9:
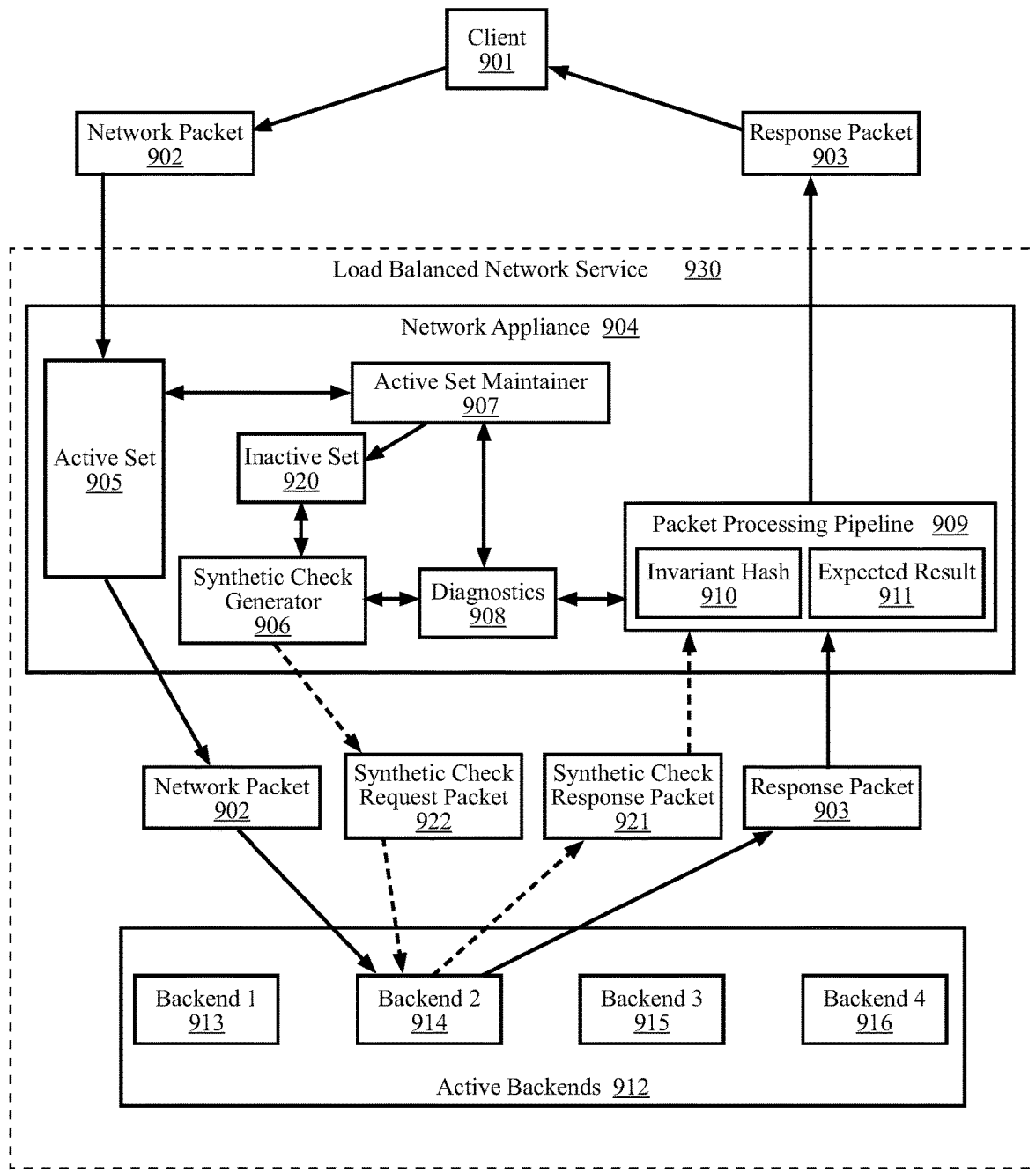
FIG. 9 illustrates a network appliance acting as a load balancer according to some aspects.

FIG. 9 illustrates a network appliance 904 acting as a load balancer according to some aspects. A client 901 receives a response packet 903 in response to a network packet 902 sent to a load balanced network service 930. The load balanced network service 930 is implemented with a network appliance 904 and numerous backends. The network appliance 904 receives the network packet 902 and selects a backend from the active set 905. The active set 905 indicates the backends that are active backends 912 for the network service. The active backends 912 are backend 1 913, backend 2 914, backend 3 915, and backend 4 916. Here, backend 2 914 has been selected from the active set 905. The network packet 902 is forwarded to backend 2 914 which responds with a response packet 903. The response packet 903 passes through the network appliance 904 in order to reach the client 901. The network appliance 904 can use a packet processing pipeline, such as a P4 pipeline, to calculate an invariant hash 910 from the response packet 903 and to compare the invariant hash 910 to an expected result 911. If the invariant hash 910 does not match the expected result 911, then the packet processing pipeline can alert diagnostics 908 in the control plane. The diagnostics may analyze the response packet 903 using preconfigured rules, response templates, and other data. Based on the diagnostics, the network appliance may move backend 2 914 from the active set 905 to an inactive set 920.

An active set maintainer 907 may be responsible for moving backends into and out of the active set 905 based on the diagnostics 908 and other factors, such as directives from administrators. An aspect of maintaining the active set can be sending synthetic check request packets 922 to the backends. A synthetic check generator 906 can send a synthetic check request packet 922 to a backend that is in the active set 905 or that is in the inactive set 920. The backend may respond to the synthetic check request packet 922 with a synthetic check response packet 921. The network appliance 904 can use a packet processing pipeline, such as a P4 pipeline, to calculate an invariant hash 910 from the synthetic check response packet 921 and to compare the invariant hash 910 to an expected result 911. If the invariant hash 910 does not match the expected result 911, then the packet processing pipeline can alert diagnostics 908 in the control plane.

In some implementations, a proxy generates synthetic health check packets. A separate proxy may discard any synthetic check response packets it receives without analyzing them because the network appliance can perform diagnostics on network traffic passing to and from the backends.

The packet processing pipeline may inform the diagnostics 908 when an invariant hash does match the expected result. The diagnostics may use such information for determining the percentages or rates by which erroneous packets are returned. For example, a preconfigured rule can indicate that a certain error rate is acceptable or that certain layer 2 error rates, layer 3 error rates, layer 4 error rates, certain layer 5 error rates, layer 6 error rates, or layer 7 error rates are acceptable.

Figure 10:
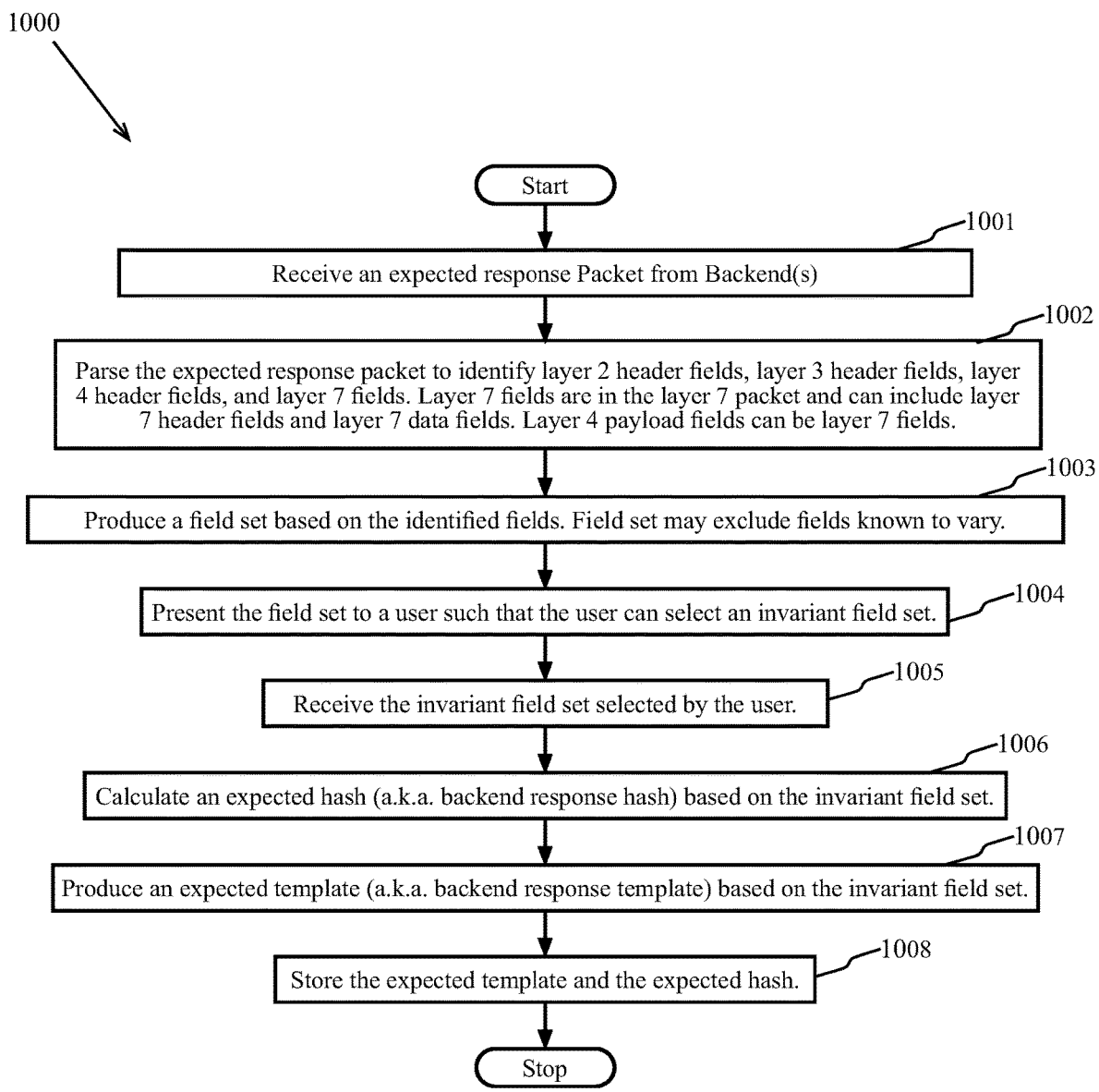
FIG. 10 is a high-level flow diagram illustrating a process that produces expected hashes and expected templates based on user selected fields according to some aspects.

FIG. 10 is a high-level flow diagram illustrating a process 1000 that produces expected hashes and expected templates based on user selected fields according to some aspects. At block 1001, an expected response packet is received from a backend. An expected response is the response that a backend returns when the backend processes the network packet correctly. An erroneous response is the response that is received when the backend does not process the network packet correctly. At block 1002, the process can parse the expected response packet to identify layer 2 header fields, layer 3 header fields, layer 4 header fields, and layer 7 fields. As discussed above, layer 7 fields are in the layer 7 packet and can include layer 7 header fields and layer 7 data fields. Layer 4 payload fields can be layer 7 fields. At block 1003, the process can produce a field set based on the identified fields. The field set may exclude fields known to vary. For example, some timestamps should always be different. The field set may therefore automatically exclude those timestamps from the field set because they will never be invariant fields.

At block 1004, the process can present the field set to a user such that the user can select an invariant field set. The user, based on experience and personal knowledge may select those fields that the user knows, or believes, are invariant in that they are known to be the same when the backend is healthy (responding correctly). At block 1005, the process can receive the invariant field set selected by the user. For example, the field set may be presented in the form of a GUI where each field can be selected/deselected as an invariant field via check boxes, buttons, etc. The user may submit the invariant field set via the GUI. At block 1006, the process can calculate an expected hash (a.k.a. backend response hash) based on the values of the fields in the invariant field set. The values for the invariant fields can be obtained from the expected response packet received at block 1001. The expected hash may be calculated using a hashing algorithm, using CRC circuit 421, or by some other method. At block 1007, the process can produce an expected template (a.k.a. backend response template) based on the invariant field set. The expected template can indicate the expected values for the invariant fields. At block 1008, the process can store the expected template and the expected hash.

Figure 11:
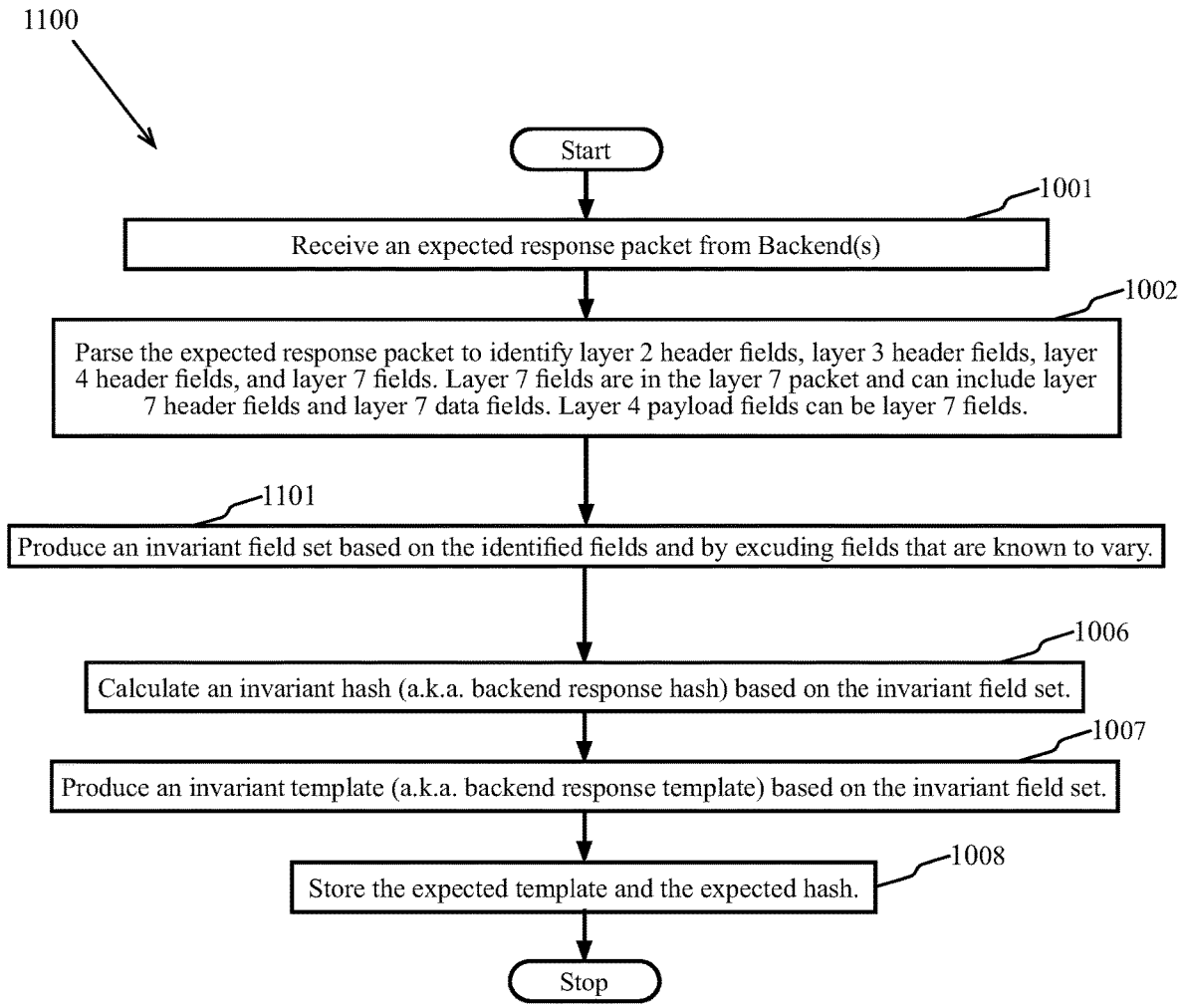
FIG. 11 is a high-level flow diagram illustrating a process that produces expected hashes and expected templates according to some aspects.

FIG. 11 is a high-level flow diagram illustrating a process 1100 that produces expected hashes and expected templates according to some aspects. The process of FIG. 11 is similar to the process of FIG. 10, except that a user does not select the invariant fields via a GUI. Instead, at block 1101, the process produces an invariant field set based on the identified fields and by excluding the fields that are known to vary. Those practiced in the art know that for specific protocols at the various layers there are fields that will be invariant and fields that will never be invariant. As such, the network appliance can automatically produce, or can be preconfigured with, invariant field sets. The invariant field sets can be produced by including only a set of preconfigured known invariant fields or by identifying fields in the expected response and excluding fields that are in a preconfigured list of fields known to never be invariant or likely to not be invariant. Note that a person using a GUI may select other fields as invariant fields due to the user's knowledge of the network service, configuration of the backends, etc.

Figure 12:
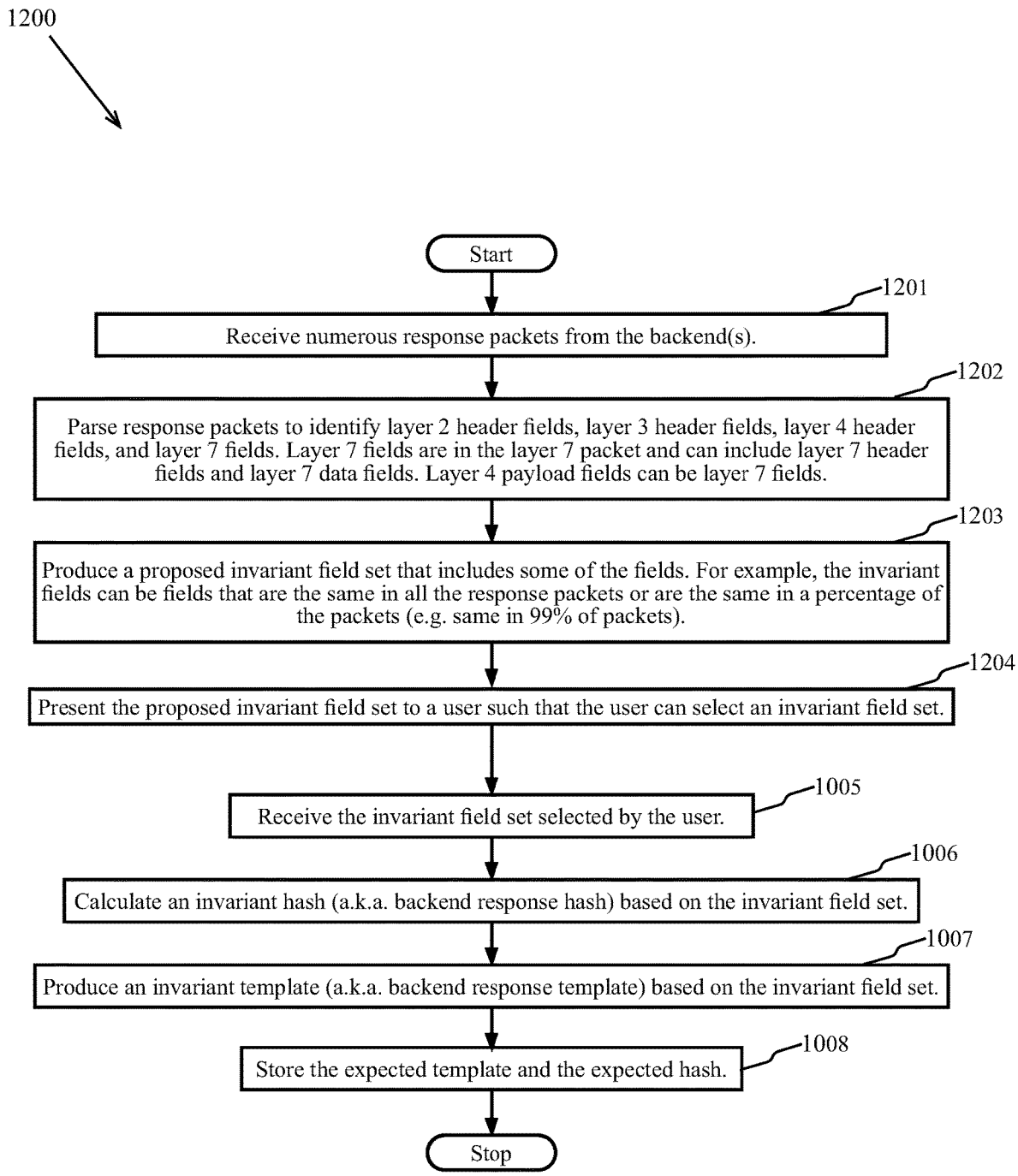
FIG. 12 is a high-level flow diagram illustrating a process that produces expected hashes and expected templates based on user selections and a proposed invariant field set according to some aspects.

FIG. 12 is a high-level flow diagram illustrating a process 1200 that produces expected hashes and expected templates based on user selections and a proposed invariant field set according to some aspects. The process 1200 of FIG. 12 differs from those of FIGS. 10-11 in that the network appliance can observe responses produced by one or more backends and can infer which fields are likely invariant because the invariant fields are the ones that are always the same or are always the same in at least certain percentage of the responses. For example, a 1% error rate may be assumed, in which case the fields that are always the same at least 99% of the time may be proposed to the user as invariant fields.

At block 1201, the process can receive numerous response packets from the backend(s). The expected hashes and templates may be specific to each backend when the invariant fields include fields that change based on which backend is responding. For example, the source IP address is an invariant field for a single backend when it contains the IP address of that specific backend. Alternatively, the expected hashes and templates may be invariant for numerous backends when the fields that change based on which backend is responding are excluded from the invariant field set. At block 1202, the process can parse response packets to identify layer 2 header fields, layer 3 header fields, layer 4 header fields, and layer 7 fields. Layer 7 fields are in the layer 7 packet and can include layer 7 header fields and layer 7 data fields. Layer 4 payload fields can be layer 7 fields.

At block 1203, the process can produce a proposed invariant field set that includes some of the fields. For example, the invariant fields can be fields that are the same in all the response packets or are the same in a percentage of the packets (e.g. the same in 99% of packets). In addition, the proposed invariant field set may exclude a preconfigured set of fields that are likely to vary or can include a preconfigured set of fields that should be invariant.

At block 1204, the process can present the proposed invariant field set to a user such that the user can select an invariant field set. At block 1005, the process can receive the invariant field set selected by the user. For example, the field set may be presented in the form of a GUI where each field can be selected/deselected as an invariant field via check boxes, buttons, etc. The user may submit the invariant field set via the GUI. At block 1006, the process can calculate an expected hash (a.k.a. backend response hash) based on the values of the fields in the invariant field set. The values for the invariant fields can be obtained from the expected response packet received at block 1001. The expected hash may be calculated using a hashing algorithm, using CRC circuit 421, or by some other method. At block 1007, the process can produce an expected template (a.k.a. backend response template) based on the invariant field set. The expected template can indicate the expected values for the invariant fields. At block 1008, the process can store the expected template and the expected hash.

FIG. 13 illustrates a first portion of an example of a graphical user interface (GUI) 1301 that can be used for selecting an invariant field set according to some aspects. One or more responses from a backend can be analyzed to identify the fields in the responses that can be parsed by the data plane. Some or all of those fields can be presented to a user in a GUI such that the user can select the invariant fields. Some of the fields can be preselected as invariant or as not invariant. The preselection can be based on preconfigured data indicating which fields are or are not invariant. The preconfigured data may be user configurable using a GUI similar to GUI 1301.

The GUI 1301 of FIGS. 13 and 14 includes rows having three elements. There is one row for each network packet field. The first element shows the name of the network packet field. The second element shows an example of the value of the network packet field. The third element provides an input that the user can use to select the network packet field as invariant or not invariant. The exemplary field values can be obtained from a response packet produced by a backend. The illustrated fields include header fields and payload fields. Different backends may have different fields, more fields, or less fields than those presented in GUI 1301.

The first portion of the GUI 1301 illustrated in FIG. 13 has sections for layer 2 header fields 1302, layer 3 header fields 1303, and layer 4 header fields 1304. The first row of the illustrated layer 2 header fields is for the source MAC Address, as indicated by the field name, the example value is "00:0a:95:9d:68:16", and the selection input shows that the source MAC address is currently selected as an invariant field. Looking to the next row, it is seen that the destination MAC address is currently selected as not invariant. The remainder of the GUI rows for the layer 2, 3, and 4 header fields similarly show the field names, exemplary values, and the current selection. A "Go To Page 2" button at the bottom of the first portion of the GUI 1301 can be selected by a user such that the user goes to a different GUI portion such as that shown in FIG. 14. A "Done" button at the bottom of the GUI 1301 can be selected by the user to indicate that an invariant field set has been selected based on the field set presented to the user in the GUI 1301.

An invariant field set can include invariant fields from many network layers. The non-limiting example of FIG. 13 contemplates such an invariant field set. An embodiment can have a layer specific invariant field set that has invariant fields from only one network layer. Such an embodiment calculates the invariant hash using those invariant fields and focuses its error detection and diagnosis on that one network layer. Other embodiments can have numerous invariant field sets. For example, a first invariant field set can include invariant fields from many network layers, a second invariant field set can include invariant fields only from layer 2, a third invariant field set can include invariant fields only from layer 3, a fourth invariant field set can include invariant fields only from layer 4, and a fifth invariant field set can include invariant fields only from layer 7. Here, the second, third, fourth and fifth invariant field sets are layer specific invariant field sets. Such embodiments can calculate five invariant hashes and the expected result can include an expected hash value for each of the five invariant fields. As such, comparisons in the data plane can detect an error and can help diagnose what network layer is presenting the error. Embodiments can have one or more layer specific invariant field set.

FIG. 14 illustrates a second portion of the example of a GUI 1301 that can be used for selecting an invariant field set according to some aspects. The second portion of the GUI 1301 has sections for layer 7 header fields and layer 7 payload fields. Here, the layer 7 packet is an HTTP packet carrying an HTML document. As such, the layer 7 header fields are HTTP fields and the layer 7 payload fields are HTML fields. A "Go To Page 1" button at the bottom of the second portion of the GUI 1301 can be selected by a user such that the user goes to a different GUI portion such as that shown in FIG. 13. A "Done" button at the bottom of the GUI 1301 can be selected by the user to indicate that an invariant field set has been selected based on the field set presented to the user in the GUI 1301.

Figure 15:
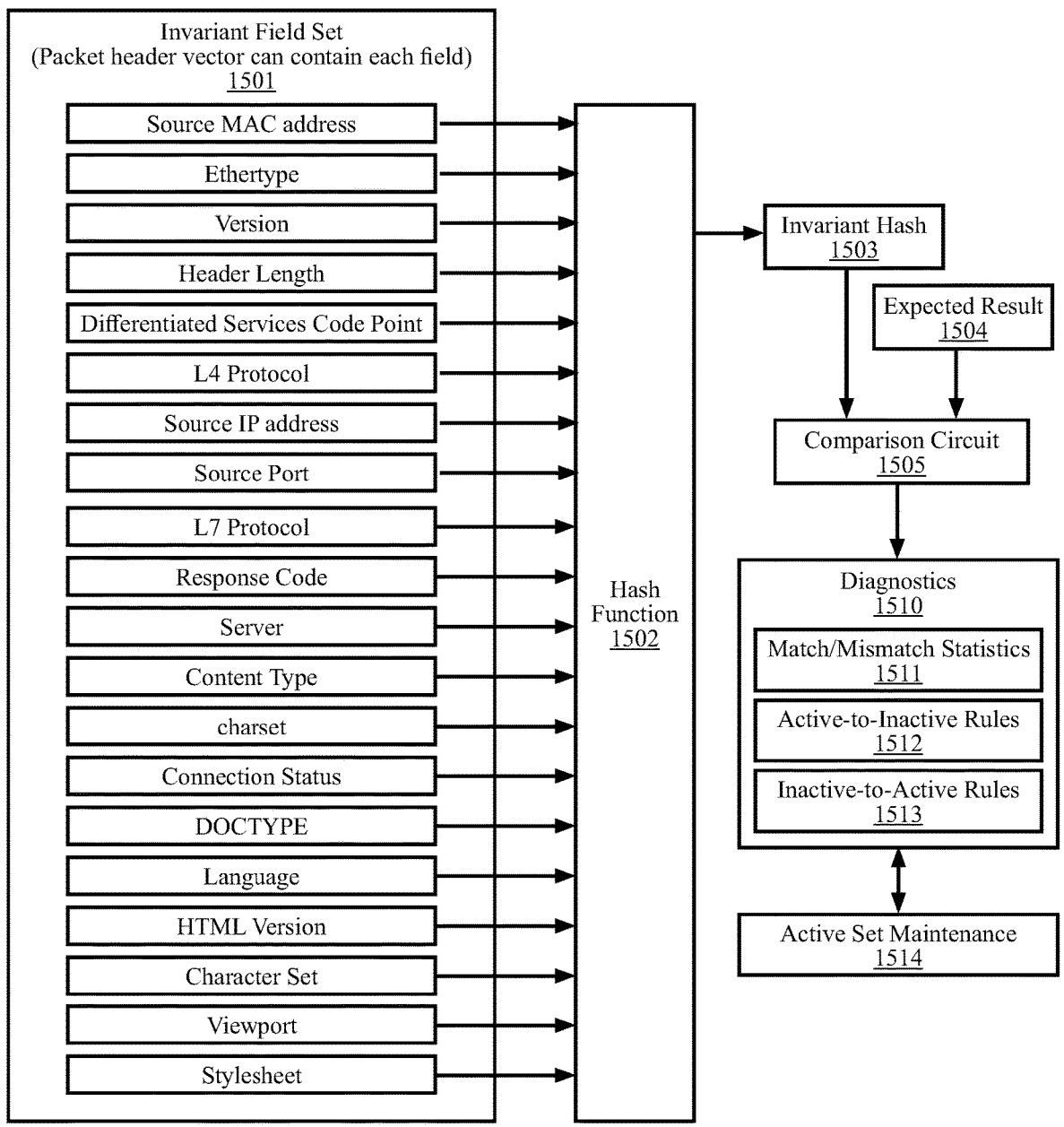
FIG. 15 is a high-level block diagram illustrating the use of an invariant field set in maintaining an active set indicating active backends for a load balanced network service according to some aspects.

FIG. 15 is a high-level block diagram illustrating the use of an invariant field set 1501 in maintaining an active set indicating active backends for a load balanced network service according to some aspects. The invariant field set 1501 can be the invariant field set selected by a user from a field set presented in a GUI such as GUI 1301. When a response packet is received from a backend, the values in the invariant fields can be combined by concatenation or some other logical or arithmetic function. The combination of values can be hashed using a hash function 1502 to produce the invariant hash 1503. The hash function can be implemented in hardware, such as CRC 421, such that the calculation of the hash function can occur at line speed. A comparison circuit 1505 can compare the invariant hash to an expected result 1504. The expected result 1504 can be a previously calculated invariant hash from an invariant field set obtained from a response packet that is known to be a desired response from a backend. A successful response is indicated when the invariant hash 1503 matches the expected result 1504. An unsuccessful response is indicated when the invariant hash 1503 does not match the expected result 1504. The output of the comparison circuit 1505 can be provided to diagnostics 1510.

The diagnostics 1510 may record the result of the comparison in the match/mismatch statistics 1511 (e.g. by incrementing a match counter or mismatch counter). In the case of an unsuccessful response, the diagnostics 1510 may apply active-to-inactive rules 1512 to determine if the responding backend should be moved from the active set to the inactive set. For example, if a backend responded unsuccessfully 3 times in a row or has responded successfully less than 70% of the time, then the backend may be moved into the inactive set.

In the case of a successful match, the diagnostics 1510 may apply inactive-to-active rules 1513 to determine if the responding backend should be moved from the inactive set to the active set. For example, if a backend has successfully responded ten times in a row or has successfully responded 95% of the time, then the backend may be moved to the active set.

Diagnostics 1510 can inform active set maintenance 1514 that a backend is to be moved into the active set or into the inactive set. If the backend is already in that set, active set maintenance 1514 can leave it there. Otherwise, active set maintenance 1514 can move the backend to the active set or to the inactive set as directed.

The invariant hash is described as being calculated from a response packet. As is well known in networking, a layer 4 payload may be fragmented into a number of layer 4 packets for and during transmission. It would therefore seem that calculating the invariant hash could require reassembly of the payload if the invariant field set includes layer 7 fields (either header or payload fields). As such, some implementations the health monitor may only use L2-L4 fields. Another alternative is to only check the first packet in a response that is fragmented across many packets. The first packet in a response can be easily identified from the header fields. For example, a TCP sequence number can be used to identify the first packet in a response.

Figures 16, 17:
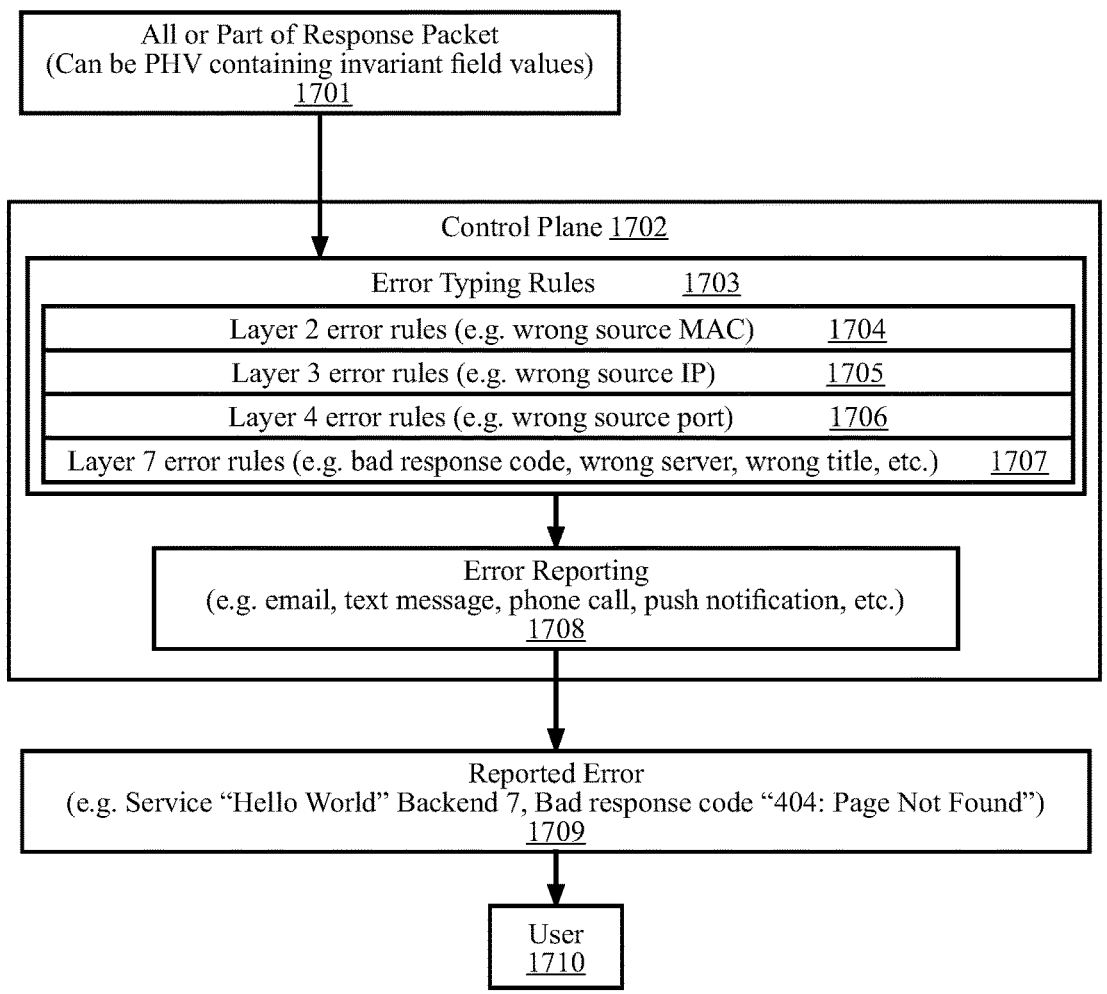
FIG. 16 illustrates an example of a backend expected results table according to some aspects.
FIG. 17 is a high-level block diagram illustrating an example of a control plane determining an error type indicated by a response packet according to some aspects.

FIG. 16 illustrates an example of a backend expected results table 1601 according to some aspects. The expected result for backend 1 is a single expected hash that can be compared to an invariant hash. The expected hash can be calculated from a known good packet, or an expected result such as a backend response template. The expected result for backend 2 is a single expected hash that can be compared to an invariant hash. The expected result for backend 3 includes two expected hashes. Having two expected hashes in an expected result may be the result of selecting the HTML title field as an invariant hash because the backend, when healthy, returns responses having two different titles. In the case of backend 3, the invariant hash matches the expected result when it is the same as the first expected hash for backend 3 or is the same as the second expected hash for backend 3.

FIG. 17 is a high-level block diagram illustrating an example of a control plane determining an error type indicated by a response packet according to some aspects. An unsuccessful response discovered by the data plane (e.g. at comparison circuit 1505) can be reported to the control plane. All or part of the response packet 1701 can be sent to the control plane 1702 for analysis. The control plane can use error typing rules 1703 to determine the error type. Layer 2 error rules 1704 can identify layer 2 errors. For example, the wrong source MAC address can indicate a layer 2 error. Layer 3 error rules 1705 can identify layer 3 errors. For example, the wrong source IP address can indicate a layer 3 error. Layer 4 error rules 1706 can identify layer 4 errors. For example, the wrong source port can indicate a layer 4 error. Layer 7 error rules 1707 can identify layer 7 errors. For example, a bad response code, wrong server, or wrong title can indicate a layer 7 error.

After the error typing rules 1703 are applied to the packet 1701, the error, including error type, can be reported. Error reporting 1708 can use email, text messages, phone calls, push notifications, and other resources to report the error. The reported error 1709 can describe the error and can include the error type as determined by the error typing rules 1703. A user 1710 (e.g. an administrator for the network service) can receive the reported error 1709. Some embodiments may collect the reported errors in an error log that can be analyzed to produce statistics for the reported errors. A large number of errors of a certain type can indicate that the network service is suffering from an architectural flaw, configuration flaw, systemically bad hardware, etc.

The non-limiting example of FIG. 17 includes error reporting as an alert to the user. Some embodiments may omit alerting the user while maintaining the active set of backends using the data obtained via error detection and error type diagnostics.

Those familiar with computer networking will recognize that the layers and errors described herein refer generally to the internet model. Those familiar with computer networking also know that there are other models, such as the seven-layer Open Systems Interconnect (OSI) model. The internet model's layer 4 generally corresponds to OSI model's layers 3 and 4. The internet model's layer 7 generally corresponds to OSI model's layers 5, 6, and 7. Those using the OSI model may define field sets, invariant fields, error typing rules, error types, etc. based on the layers of the OSI model.

Figure 18:
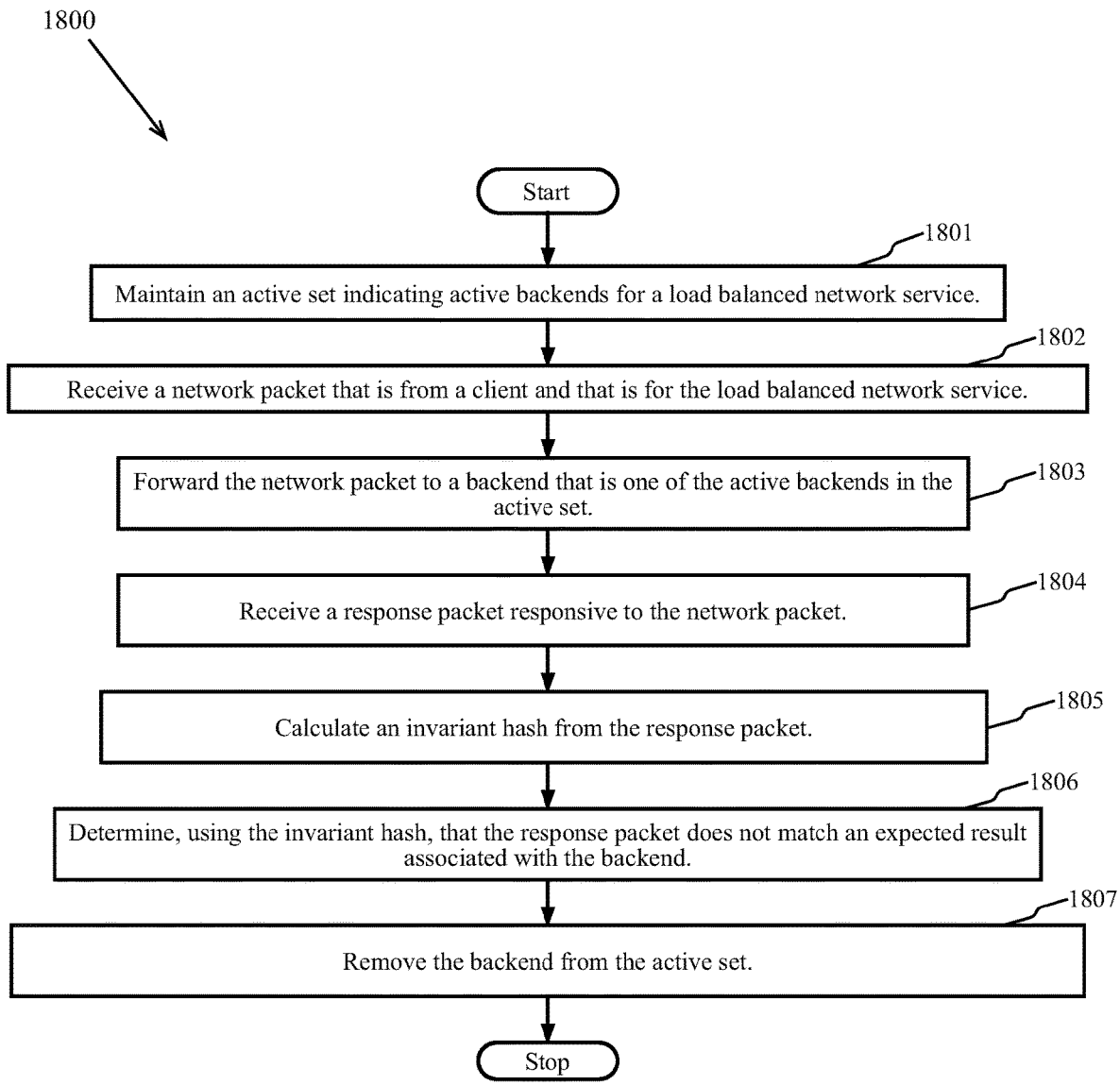
FIG. 18 is a high-level flow diagram of a method for accelerated health monitoring for load balancers according to some aspects.

FIG. 18 is a high-level flow diagram of a method for accelerated health monitoring for load balancers 1800 according to some aspects. After the start, at block 1801 the method can maintain an active set indicating active backends for a load balanced network service. At block 1802, the method can receive a network packet that is from a client and that is for the load balanced network service. At block 1803, the method can forward the network packet to a backend that is one of the active backends in the active set. At block 1804, the method can receive a response packet responsive to the network packet. At block 1805, the method can calculate an invariant hash from the response packet. At block 1806, the method can determine, using the invariant hash, that the response packet does not match an expected result associated with the backend. At block 1807, the method can remove the backend from the active set. A backend can be removed from the active set by being moved to an inactive set.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method implemented by a network appliance, the method comprising:
   maintaining an active set indicating a plurality of active backends for a load balanced network service;
   storing an expected result for a backend that is one of the active backends;
   receiving a first network packet sent to the load balanced network service by a client;
   transmitting the first network packet to the backend;
   receiving an expected response packet from the backend that is responsive to the first network packet;
   calculating a first invariant hash from the expected response packet;
   determining that the first invariant hash matches the expected result;
   sending the expected response packet to the client;
   receiving a second network packet sent to the load balanced network service;
   transmitting the second network packet to the backend;
   receiving an erroneous response packet from the backend that is responsive to the second network packet;
   calculating a second invariant hash from the erroneous response packet;
   determining that the second invariant hash does not match the expected result; and
   removing the backend from the active set.

2. The method implemented by the network appliance of claim 1, wherein:
   an invariant field set identifies a plurality of invariant fields of a plurality of response packets;
   the network appliance includes a packet processing pipeline that includes a parser and a match-action unit;
   the parser extracts data from a plurality of identified fields in the expected response packet and in the erroneous response packet;
   the first invariant hash is calculated from the invariant fields of the expected response packet;
   the second invariant hash is calculated from the invariant fields of the erroneous response packet; and
   the packet processing pipeline determines that the first invariant hash matches the expected result and that the second invariant hash does not match the expected result.

3. The method implemented by the network appliance of claim 1, wherein the erroneous response packet is an HTTP packet.

4. The method implemented by the network appliance of claim 1, further including:
   storing an invariant field set that identifies a plurality of invariant fields of a plurality of response packets, wherein
   the first invariant hash is calculated from the invariant fields of the expected response packet; and
   the second invariant hash is calculated from the invariant fields of the erroneous response packet.

5. The method implemented by the network appliance of claim 1, further including:
  generating a synthetic check request packet;
  transmitting the synthetic check request packet to the backend;
  receiving a response packet from the backend that is responsive to the synthetic check request packet;
  calculating a third invariant hash from the response packet; and
  determining that the third invariant hash matches the expected result.

6. The method implemented by the network appliance of claim 1, wherein the first invariant hash is calculated using at least one of a layer 4 header field, or a layer 7 field.

7. The method implemented by the network appliance of claim 1, the method including:
  forwarding at least part of the erroneous response packet from a data plane of the network appliance to a control plane of the network appliance; and
  determining, by the control plane, an error type indicated by the erroneous response packet,
  wherein the error type is a layer 4 error, a layer 5 error, a layer 6 error, or a layer 7 error.

8. The method implemented by the network appliance of claim 1, wherein the expected result includes a plurality of expected hashes.

9. The method implemented by the network appliance of claim 1, the method including:
  producing a field set from a response packet received from the backend; and
  producing an expected hash based on an invariant field set selected by a user from the field set,
  wherein the expected result is or includes the expected hash.

10. The method implemented by the network appliance of claim 1, the method including:
  forwarding a plurality of network packets to the backend;
  receiving a plurality of response packets responsive to the plurality of network packets;
  producing a proposed invariant field set based on the plurality of response packets; and
  producing an expected hash based on an invariant field set selected by a user based on the proposed invariant field set,
  wherein the expected result is or includes the expected hash.

11. A network appliance comprising:
  a memory configured to store an active set indicating a plurality of active backends for a load balanced network service, an invariant field set that identifies a plurality of invariant fields of a plurality of response packets, and an expected result for a backend that is one of the active backends; and
  a packet processing pipeline that includes a parser and a match-action unit, the packet processing pipeline configured to identify a plurality of expected response packets and a plurality of erroneous response packets by comparing the expected result to a plurality of invariant hashes calculated from the invariant fields of the response packets,
  wherein
    the parser is configured to extract data from a plurality of identified fields in the response packets,
    the network appliance is configured to forward a plurality of network packets received from plurality of clients to the active backends,
    the network appliance receives the response packets from the active backends in response to the network packets, and
    the network appliance is configured to remove the backend from the active set when the packet processing pipeline indicates that the backend has returned one of the erroneous response packets.

12. The network appliance of claim 11, wherein the network appliance is configured to:
  generate a synthetic check request packet;
  transmit the synthetic check request packet to the backend;
  receive a response packet from the backend that is responsive to the synthetic check request packet; and
  remove the backend from the active set after and because the packet processing pipeline indicates that the response packet is an erroneous response packet.

13. The network appliance of claim 11, wherein the one of the erroneous response packets is an HTTP packet.

14. The network appliance of claim 11, wherein the invariant hashes are calculated using at least one of a layer 3 header field, a layer 4 header field, a layer 5 header field, or a layer 7 field.

15. The network appliance of claim 11 further including:
  a data plane that includes the packet processing pipeline, the packet processing pipeline configured to receive a plurality of packets on an input interface, processes the packets, and then forward packets to a desired output interface; and
  a control plane, configured to provide forwarding information to the data plane and to receive at least part of the one of the erroneous response packets from the data plane, and determine an error type indicated by the one of the erroneous response packets.

16. The network appliance of claim 11, wherein the expected result includes a plurality of expected hashes.

17. The network appliance of claim 11, wherein the network appliance is configured to:
  produce a field set from an expected response packet received from the backend; and
  produce an expected hash based on the invariant field set,
  wherein the invariant field set is selected by a user from the field set, and the expected result is or includes the expected hash.

18. The network appliance of claim 11, wherein the network appliance is configured to:
  generate a proposed invariant field set based on the response packets; and
  generate an expected hash based on the invariant field set, wherein
    the invariant field set is selected from the proposed invariant field set by a user, and
    the expected result is or includes the expected hash.

19. A load balancing system comprising:
  a means for forwarding a plurality of network packets received from a plurality of clients to a plurality of active backends in an active set of a load balanced network service;
  a means for receiving a plurality of response packets sent by the active backends in response to the network packets;
  a means for indicating a plurality of invariant fields of the response packets;
  a means for using the invariant fields of the response packets to identify a plurality of expected response packets;

a means for using the invariant fields of the response packets to identify a plurality of erroneous response packets; and a means for removing a backend from the active set when the backend sends one of the erroneous response packets, wherein comparing a plurality of expected results to a plurality of invariant hashes calculated from the invariant fields of the response packets indicates whether a response packet is an expected response packet or an erroneous response packet.

20. The load balancing system of claim 19, wherein a packet processing pipeline that includes a parser and a match-action unit implements the means for using the invariant fields of the response packets to identify the expected response packets and the erroneous response packets, and the parser is configured to extract data from a plurality of identified fields in the response packets.

\* \* \* \* \*